(12) United States Patent
Baek et al.

(10) Patent No.: US 9,034,424 B2
(45) Date of Patent: May 19, 2015

(54) HAND-TEARABLE ADHESIVE TAPE AND METHOD FOR MANUFACTURING THE SAME

(75) Inventors: Seung Jin Baek, Seoul (KR); Jin Hoi Kim, Gyeongsan-si (KR)

(73) Assignee: TAEYOUNG CHEMICAL IND. CO., LTD., Yangju-Si, Gyeonggi-Do (KR)

(*) Notice: Subject to any disclaimer, the term of this patent is extended or adjusted under 35 U.S.C. 154(b) by 704 days.

(21) Appl. No.: 13/178,075

(22) Filed: Jul. 7, 2011

(65) Prior Publication Data

US 2012/0009838 A1     Jan. 12, 2012

(30) Foreign Application Priority Data

Jul. 9, 2010    (KR) ................ 10-2010-0066400

(51) Int. Cl.
*B05D 5/10*     (2006.01)
*C09J 7/04*     (2006.01)
*C08K 5/00*     (2006.01)

(52) U.S. Cl.
CPC ............. *C09J 7/04* (2013.01); *C08K 5/0066* (2013.01); *C09J 2205/106* (2013.01); *C09J 2400/263* (2013.01); *C09J 2433/00* (2013.01)

(58) Field of Classification Search
USPC ............. 427/170, 171, 176, 207.1, 314, 331, 427/208.4; 428/32.77, 40.1, 43, 47, 57, 428/102, 103, 131, 132, 136, 137, 138, 139, 428/140, 141, 144, 343, 354, 542.6, 920; 442/136, 149
See application file for complete search history.

(56) References Cited

U.S. PATENT DOCUMENTS

| | | | | |
|---|---|---|---|---|
| 4,762,751 A | * | 8/1988 | Girgis et al. | 428/378 |
| 6,436,528 B1 | * | 8/2002 | Kulper et al. | 428/343 |
| 2004/0126574 A1 | * | 7/2004 | Kawaguchi et al. | 428/343 |
| 2005/0165193 A1 | * | 7/2005 | Patel et al. | 526/352 |
| 2006/0270300 A1 | * | 11/2006 | Kim et al. | 442/304 |
| 2007/0259163 A1 | * | 11/2007 | Connolly et al. | 428/219 |
| 2008/0261013 A1 | * | 10/2008 | Lee | 428/222 |
| 2009/0068463 A1 | * | 3/2009 | Mochizuki et al. | 428/370 |

FOREIGN PATENT DOCUMENTS

KR     10-0717605     5/2007

* cited by examiner

*Primary Examiner* — Xiao Zhao
(74) *Attorney, Agent, or Firm* — Kile Park Reed & Houtteman PLLC

(57) ABSTRACT

Disclosed are a hand-tearable adhesive tape which is made of a sheet woven with warps and wefts, in which the warps have a smaller titer than the wefts, and is coated with a flame retardant to provide flame retardancy and is with an adhesive agent, and a method for manufacturing the same. Advantageously, the hand-tearable adhesive tape can exhibit superior adhesive force, while providing flame retardancy and can be torn by hand.

7 Claims, 4 Drawing Sheets

HAND-TEARABLE ADHESIVE TAPE AND METHOD FOR MANUFACTURING THE SAME

BACKGROUND OF THE INVENTION

1. Field of the Invention

The present invention relates to a hand-tearable adhesive tape and a method for manufacturing the same. More specifically, the present invention relates to an adhesive tape for wiring harnesses for automobiles and an electrically insulating adhesive tape which can maintain superior adhesive force, while providing flame retardancy, and a method for manufacturing the same.

2. Description of the Related Art

In general, an electrical tape is an adhesive tape used for preventing short circuit, which is mainly used when electrical wires are connected or coating thereof is peeled off.

Such an electrical tape is commonly manufactured by coating, with a decompression adhesive layer, the surface of a two-sided resin layer made of polyvinyl chloride (PVC) or polyester (PET), which is generally used to insulate or protect electrical wires.

Meanwhile, an electrical wire apparatus for automobiles (wiring harness) refers to a string of wires in which wire lines required for automobiles are bound together. Wires used for automobiles are low-voltage wires in which strings obtained by twisting annealed copper wires are coated with vinyl, and have smaller diameter and thinner insulating vinyl than general wires and are thus readily bent and require attention to damage to wires and to use at high temperatures.

The afore-mentioned electrical tape or adhesive tape for wiring harnesses for automobiles should be cut with an apparatus such as a pair of scissors or a knife, while being wound on electrical cables upon use. For this reason, these tapes disadvantageously involve inconvenience of the necessity of carrying such an apparatus at all times and of lengthened operation period due to cutting tapes one by one during processes requiring much use of adhesive tapes.

FIG. 3A is a view illustrating one conventional adhesive tape. FIG. 3B is a view illustrating another conventional adhesive tape.

In order to solve the afore-mentioned disadvantages, a method of forming a perforation line 102 by arranging a plurality of perforation holes 101 such that they are spaced from one another by a predetermined distance, and a method of forming a plurality of cut grooves 120 at both sides of an adhesive tape 100 have been suggested. However, in these conventional methods, the perforation line 102 and the cut grooves 120 are spaced by a predetermined distance on the surface of the adhesive tape 100, thus disadvantageously causing cutting at an undesired length and difficult length control due to inconvenience in that the tape should be cut only in regions where the perforation line 102 and cut grooves 120 are present.

In addition, the electrical tape and adhesive tape for wiring harnesses for automobiles require attention to injury to wires and to use at high temperatures, thus requiring abrasion resistance against friction and flame retardancy.

SUMMARY OF THE INVENTION

Therefore, the present invention has been made in view of the above problems, and it is one object of the present invention to provide an adhesive tape which is made of a sheet woven with warps and wefts in a predetermined density, in which the warps have a smaller titer than the wefts, and thus provides hand-tearable tearing strength and flame retardancy and exhibits superior adhesive force in spite of providing flame retardancy, and a method for manufacturing the same.

In addition, it is another object of the present invention to provide a hand-tearable adhesive tape wherein warps and wefts are fixed using a flame retardant and an adhesive agent to impart anti-raveling properties thereto, and a method for manufacturing the same.

In accordance with one aspect of the present invention, provided is a method for manufacturing a hand-tearable adhesive tape including: stretching yarns as raw materials, and twisting and untwisting the yarns by heating to perform false twisting; coating the yarns with a paste to subject the yarns to sizing for better weaving; interlacing wefts with warps to weave a fabric; drying and ironing the woven fabric to subject the fabric to processing; applying a flame retardant to one side of the processed fabric, as a pretreatment process before adhesive application; applying an adhesive agent to a predetermined thickness to the processed fabric; and drying the fabric.

In the weaving process, the warps may have a density of 32 to 37 yarns/cm and a titer of 2,432 to 2,812 dtex/cm.

In the weaving process, the wefts may have a density of 30 to 32 yarns/cm and a titer of 5,010 to 5,344 dtex/cm.

In the weaving process, the wefts may have a density of 40 to 42 yarns/cm and a titer of 6,680 to 7,014 dtex/cm.

The process of applying the flame retardant may be carried out by primarily directly coating the fabric with a binder-containing flame retardant at a temperature of 50° C. or higher, to prevent unraveling of yarns when the tape is torn.

The process of applying an adhesive agent to the fabric may include carried out by homogeneously mixing an acrylic emulsion and an adhesive resin for 30 to 90 minutes to prepare an adhesive agent, mixing the adhesive agent with the flame retardant and coating the fabric with the mixture.

In the process of applying an adhesive agent to the fabric, the acrylic emulsion and the adhesive resin may be homogeneously mixed for 30 to 90 minutes.

In the process of applying an adhesive agent to the fabric, the adhesive resin may be added in an amount of 50% to 200% by weight of, based on the weight of the acrylic emulsion.

In the process of applying an adhesive agent to the fabric, the flame retardant may be added in an amount of 5% to 50% by weight, with respect to the total weight of the acrylic emulsion and the adhesive resin.

In accordance with another aspect of the present invention, provided is a hand-tearable adhesive tape including: a base sheet woven with warps and wefts, the warps having a smaller titer than the wefts, a flame retardant layer arranged on the base sheet to fix the warps and the wefts thereon, and an adhesive layer arranged on the flame retardant layer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, preferred embodiments of the present invention will be described in detail with reference to the annexed drawings.

Figure 1:
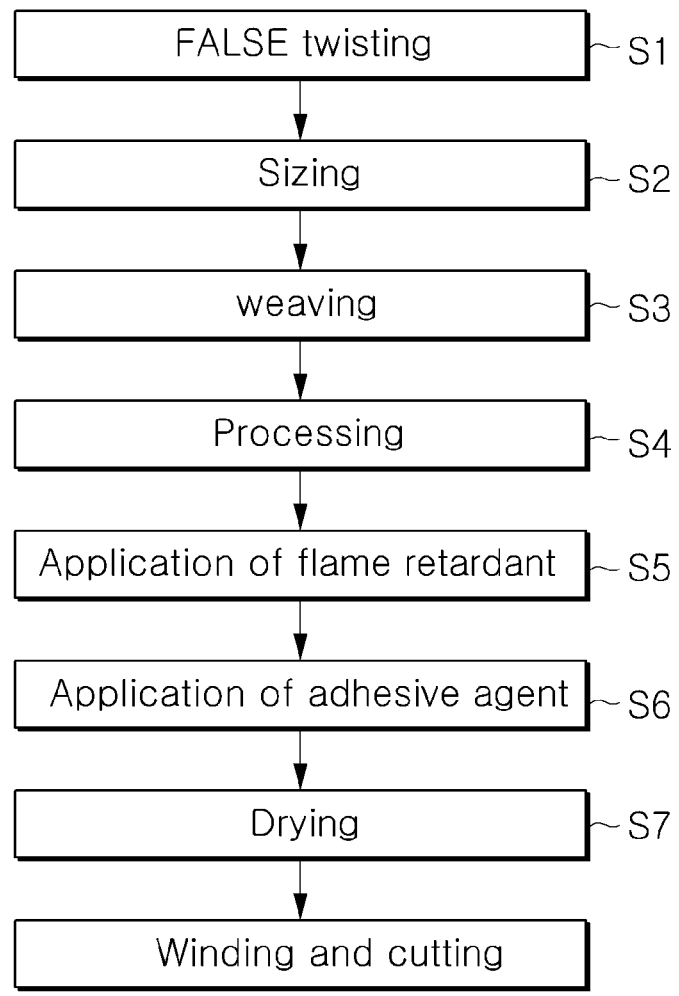
FIG. 1 is a flowchart illustrating a manufacturing process according to one embodiment of the present invention.
Figure 2:
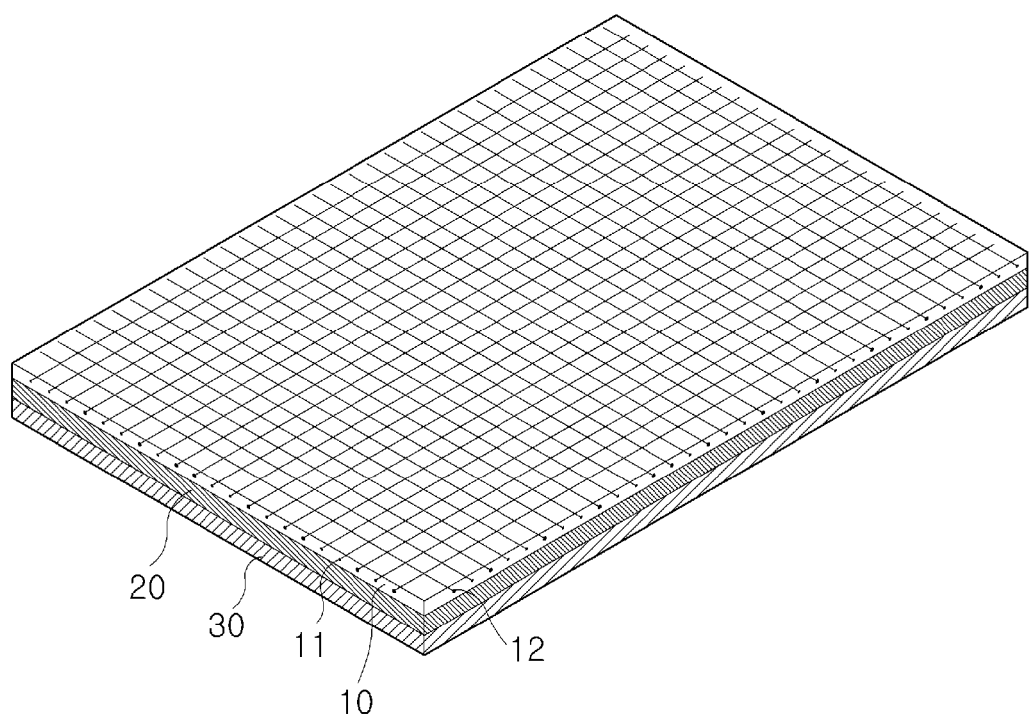
FIG. 2 is a view illustrating a layered structure of the adhesive tape manufactured by the process of FIG. 1.
Figure 3A:
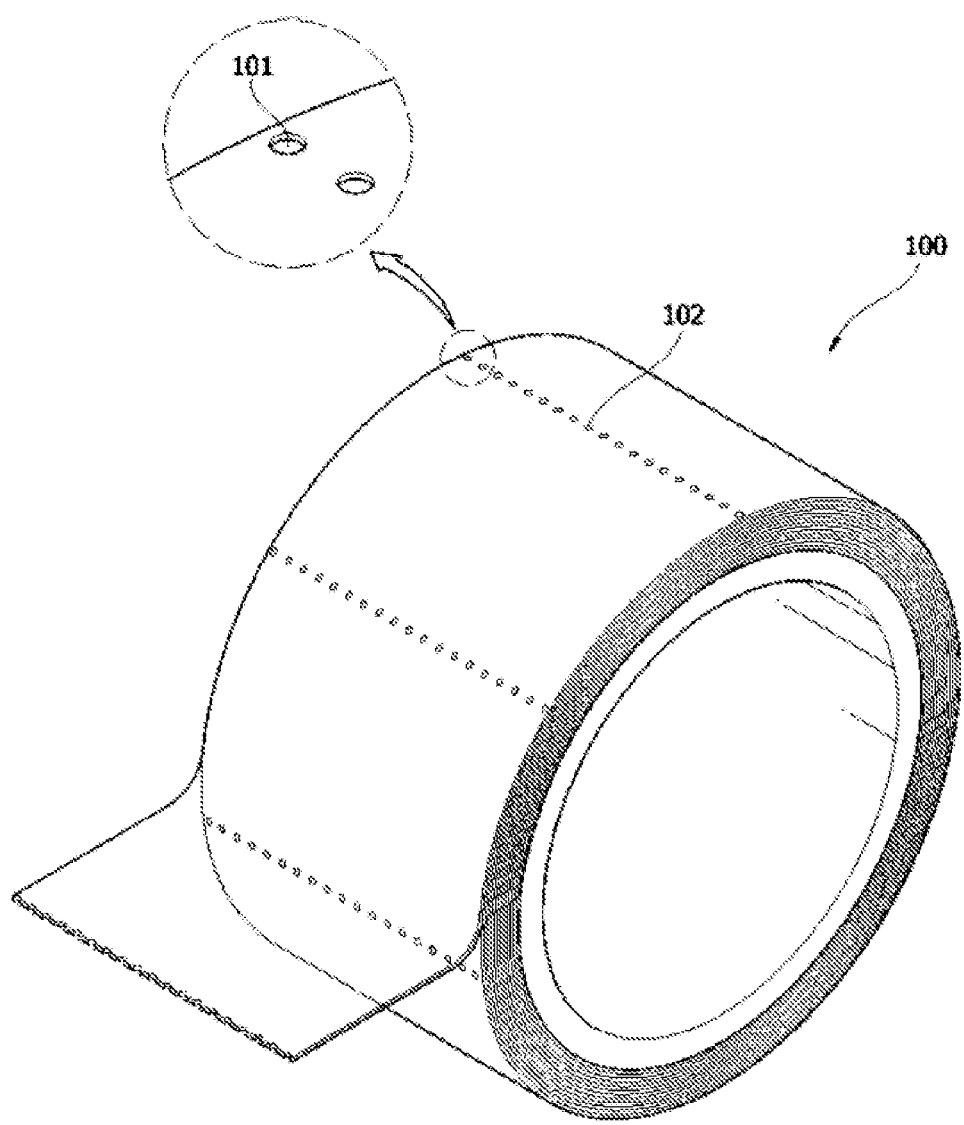
FIG. 3A is a view illustrating one conventional adhesive tape.
Figure 3B:
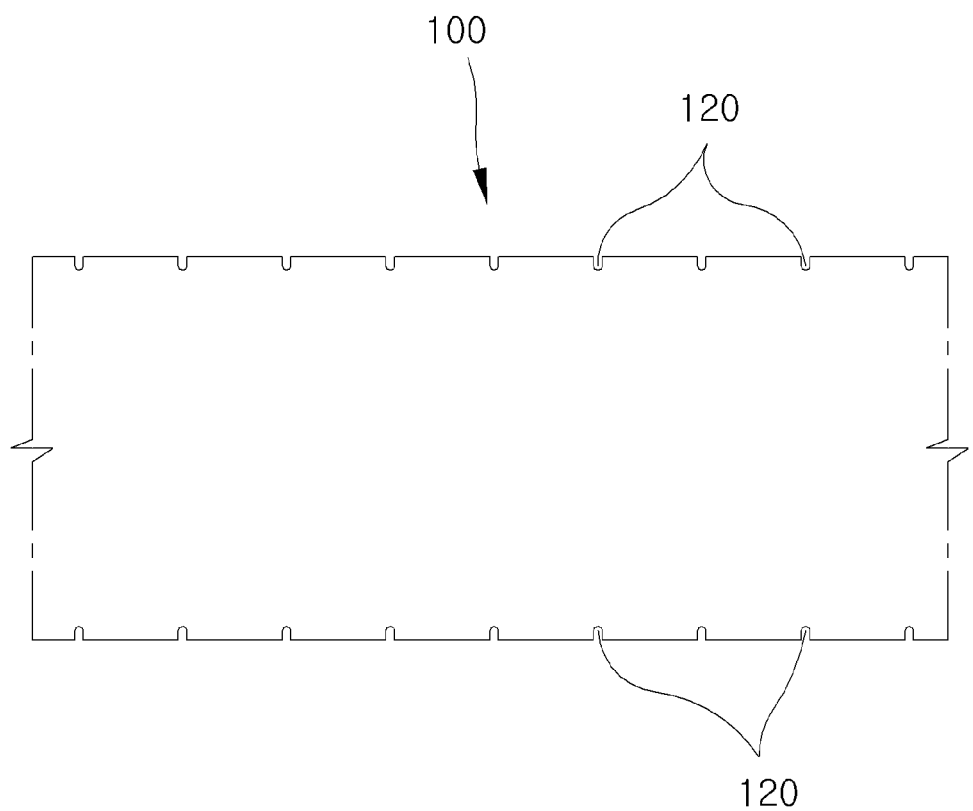
FIG. 3B is a view illustrating another conventional adhesive tape.

FIG. 1 is a flowchart illustrating a process for manufacturing an adhesive tape according to one embodiment. FIG. 2 is a view illustrating a laminate structure of an adhesive tape manufactured in accordance with the process of FIG. 1.

Referring to FIG. 1, the present invention provides a method for manufacturing a hand-tearable adhesive tape, comprising stretching yarns as raw materials, and twisting and untwisting the yarns by heating to perform false twisting (S1), coating the yarns with a paste to subject the yarns to sizing for better weaving (S2), interlacing wefts with warps to weave a fabric (S3), drying and ironing the woven fabric to subject the fabric to processing (S4), applying a flame retardant to one side of the processed fabric, as a pretreatment process before adhesive application (S5), applying an adhesive agent to a predetermined thickness to the processed fabric (S6) and drying the fabric (S7).

In addition, referring to FIG. 2, the present invention provides a hand-tearable adhesive tape which includes a fabric 10 in which warps 12 are a plain weave and wefts 11 are woven, or the wefts 11 are a matt weave and the warps 12 are woven, and an adhesive layer 30 arranged on the flame retardant layer 20.

The weft 11 refers to a horizontal yarn, the warp 12 refers to a vertical yarn, and titer refers to a thickness of yarns.

The method of the present invention includes directly coating the fabric 10 with a combination of a flame retardant and a binder and coating the fabric 10 with a flame retardant-containing adhesive agent, to homogeneously mix the flame retardant with the adhesive agent and thereby avoid deterioration in adhesion force in spite of having flame retardancy.

In the process of applying the flame retardant to the fabric (S5), a binder-containing flame retardant is primarily directly coated at a temperature of 50° C. or higher, to prevent raveling of yarns when the tape is torn. At this time, as the flame retardant, a flame retardant which is free of toxic bromine-based polymers such as polybrominated biphenyls (PBBs) and polybromodiphenyl ethers (PBDEs), or a halogen-free flame retardant is used.

The binder which exhibits superior permeability is mixed with the flame retardant and the mixture is permeated into the fabric upon primary coating to fix warps and wefts. This fixing prevents napping when the tape is torn, contributes to flame retardation and prevents the adhesive agent from escaping into the base.

In the case where the binder-containing flame retardant is coated at a temperature lower than 50° C., the flame retardant is not sufficiently dried and the adhesive agent may be transferred to the base. Accordingly, the flame retardant is preferably coated at a temperature of 50° C. or higher.

In the process of applying an adhesive agent to the fabric (S6), an acrylic emulsion and an adhesive resin are added and homogeneously mixed for 30 to 90 minutes to prepare an adhesive agent, the adhesive agent is mixed with the flame retardant and the mixture is coated.

The adhesive agent is a pressure sensitive adhesive (PSA) and, in particular, a rubber-based or acrylic-based adhesive.

In one embodiment of the present invention, as adhesive agent materials, the acrylic emulsion and 50% to 200% by weight of the adhesive resin, based on the weight of the acrylic emulsion are added.

When the mixing period is shorter than 30 minutes, the materials for the adhesive agent are not sufficiently dispersed, unevenness of properties (flame retardancy, adhesive force) occurs, and when the mixing period exceeds 90 minutes, uneven distribution of the adhesive agent can be reduced, but the adhesive agent is foamed and solid content thereof is varied.

The flame retardant is added in an amount of 5% to 50% by weight, with respect to the total weight of the acrylic emulsion and the adhesive resin.

When the content of flame retardant is within the range defined above, an adhesive force of 180 gf/19 mm or more is satisfied and the adhesive tape has self-extinguishability in which combustion does not occur at 80 mm/min or less or at 50 mm or more from a measuring point and extinguishing occurs within 60 seconds.

When the content of the flame retardant is 5% by weight or more, an adhesive force of 180 gf/19 mm of more is satisfied, and the adhesive force gradually increases, but the adhesive tape burns.

When the content of the flame retardant is 50% by weight or more, an adhesive force does not satisfy 180 gf/19 mm of more, but the adhesive tape has a self-extinguishability in which combustion does not occur at 80 mm/min or less or at 50 mm or more from a measuring point and extinguishing occurs within 60 seconds.

The amount (dry state) of the adhesive layer 30 applied is 20 to 150 g/m$^2$, preferably 50 to 120 g/m$^2$, the thickness thereof (adhesive layer thickness) is 10 μm to 50 μm and the adhesive layer 30 is dried at a temperature of 80° C. to 150° C. by hot air or UV.

When the thickness of the adhesive layer 30 is less than 10 μm, an adhesive force does not satisfy a level of 130 gf/19 mm, in a case where the tape is unwound, an unwinding force weakens and the tape is thus readily unwound, and when the thickness of the adhesive layer 30 exceeds 50 μm, in a case where the tape is unwound, the unwinding force thereof strengthens and the tape material may be readily torn on the cut surface and may thus be deformed.

The process of drying the adhesive agent (S7) is carried out by drying at a temperature of 80° C. to 150° C.

When the drying temperature is lower than 80° C., the adhesive agent is not sufficiently dried, an adhesive force is decreased, the adhesive agent spreads to the base and the tape is thus deformed, and when the drying temperature exceeds 150° C., the adhesive agent is dried and the adhesive force deteriorates.

EXAMPLE 1

Polyester (PET) yarns as raw materials were stretched, twisted and untwisted by heating to perform false twisting (S1) and the yarns were coated with a paste to subject the yarns to sizing for better weaving (S2). As a result, the warps had a density of 32 to 37 yarns/cm and a titer of 2,432 to 2,812 dtex/cm, and the wefts had a density of 30 to 32 yarns/cm and a titer of 5,010 to 5,344 dtex/cm. A fabric was woven with the warps and the wefts (S3).

The warps are a plain weave and the wefts are woven, or the wefts are a matt weave and the warps are woven.

The matt weave has a structure in which two wefts are present between adjacent warps and has a dense fabric surface, less weave deformation and more interlacing points to warps, thus being readily torn without weave deformation, as compared to a plain weave.

When the densities of warps and wefts are suitable, that is, the warps have a density of 32 to 37 yarns/cm and the wefts have a density of 30 to 32 yarns/cm, and the warps have a titer of 2,432 to 2,812 dtex/cm and the wefts have a titer of 5,010 to 5,344 dtex/cm, advantageously, the adhesive tape has a tearing strength of 650 to 950 gf, allowing the adhesive tape to be torn by hand, has a withstand voltage of 1 kV or more for one minute and abrasion resistance of 10,000 times or more. In addition, when the adhesive agent is coated, it does not escape into the back surface of the base.

However, when the yarn density is low, that is, the warps have a density of 29 to 31 yarns/cm and the wefts have a density of 29 yarns/cm or less, and the warps have a titer of 2,204 to 2356 dtex/cm and the wefts have a titer of 4843 dtex/cm or less, the adhesive tape has a low tearing strength of 650 gf or less, the adhesive tape is readily torn or the yarn structure is readily deformed and napping thus increases.

In addition, the adhesive tape does not satisfy both a withstand voltage of 1 kV or more for one minute and an abrasion resistance of 10,000 times or more. In addition, when the adhesive agent is coated, it does not escape into the back surface of the base.

In addition, when the yarn density is high, that is, the warps have a density of 38 yarns/cm or more and the wefts have a density of 33 yarns/cm or more, and the warps have a titer of 2,888 dtex/cm or more and the wefts have a titer of 5,511 dtex/cm or more, the adhesive tape does not satisfy a withstand voltage of 1 kV or more for one minute and an abrasion resistance of 10,000 times or more and napping of yarns deceases, but the adhesive tape has a high tearing strength of 950 gf or less and is not easily torn.

The woven fabric was dried and ironed to subject the fabric to processing (S4) and was then cut to the desired width, a flame retardant was applied to one side of the processed fabric as a pretreatment process before adhesive application (S5) and about 60 g/m$^2$ of an adhesive agent was applied to the processed fabric (S6) and the fabric was dried (S7), followed by cutting and packaging, to complete the adhesive tape of the present invention.

EXAMPLE 2

Acetate yarns as raw materials were stretched, twisted and untwisted by heating to perform false twisting (S1) and the yarns were coated with a paste to subject the yarns to sizing for better weaving (S2). As a result, the warps had a density of 32 to 37 yarns/cm and a titer of 2,432 to 2,812 dtex/cm, and the wefts had a density of 40 to 42 yarns/cm and a titer of 6,680 to 7,014 dtex/cm. A fabric was woven with the warps and the wefts (S3).

The warps are a plain weave and the wefts are woven, or the wefts are a matt weave and the warps are woven.

When the density of warp and wefts is preferred, that is, the warps have a density of 32 to 37 yarns/cm and the wefts have a density of 40 to 42 yarns/cm, and the warps have a titer of 2,432 to 2,812 dtex/cm and the wefts have a titer of 6,680 to 7,014 dtex/cm, advantageously, the adhesive tape has a tearing strength of 650 to 950 gf, allowing the adhesive tape to be torn by hand, has a withstand voltage of 1 kV or more for one minute and abrasion resistance of 10,000 times or more. In addition, when the adhesive agent is coated, it does not escape into the back surface of the base.

However, when the yarn density is low, that is, the warps have a density of 29 to 31 yarns/cm and the wefts have a density of 39 yarns/cm or less, and the warps have a titer of 2,204 to 2356 dtex/cm and the wefts have a titer of 6,513 dtex/cm or less, the adhesive tape has a low tearing strength of 650 gf or less, the adhesive tape is readily torn or the yarn structure is readily deformed and napping thus increases.

In addition, the adhesive tape does not satisfy a withstand voltage of 1 kV or more for one minute and an abrasion resistance of 10,000 times or more. In addition, when the adhesive agent is coated, it does not escape into the back surface of the base.

In addition, when the yarn density is high, that is, the warps have a density of 38 yarns/cm or more and the wefts have a density of 43 yarns/cm or more, and the warps have a titer of 2,888 dtex/cm or more and the wefts have a titer of 7,181 dtex/cm or more, the adhesive tape does not satisfy a withstand voltage of 1 kV or more for one minute and an abrasion resistance of 10,000 times or more and napping of yarns deceases, but the adhesive tape has a high tearing strength of 650 gf or less and is not easily torn.

Then, in the same manner as in Example 1, the woven fabric was processed (S4), a flame retardant and an adhesive agent were applied thereto (S5 and S6) and the fabric was dried (S7), followed by cutting and packaging, to complete the adhesive tape of the present invention.

Properties and method for testing associated with the measurement values obtained in Examples 1 and 2 are described in brief as follows.

The tearing strength (unit: gf) was measured using a universal testing machine (UTM). Measurement was carried out by preparing tape samples having a width of 50 mm and a length of about 200 mm along a width direction of the tape, cutting the center of the samples to about 100 mm, placing the cut and separated tape fragments on the upper and lower chucks of a tensile tester, applying tension thereto at a rate of 300±30 mm/min, measuring force four times, whenever about 20 mm of the samples are torn, and calculating an average of the force values to obtain tensile strength. The value was 650 to 950 gf.

Abrasion resistance was measured using a common abrasion resistance tester. Measurement was carried out by fixing specimen having a predetermined width of 150 mm on the test plate and measured under conditions of friction length of 100 mm, friction rate of 30 (back and forth/min), at a load of 0.5 kg and friction frequency of 10,000 times using a friction zig. As a result, the adhesive surface of the adhesive tape is not torn after 10,000 times, which means that the requirements of adhesive surface are satisfied.

Withstand voltage (unit V) was measured using a common withstand voltage tester. Measurement was carried out by preparing a specimen having a suitable size, on three points of the center of the specimen at an interval of about 200 mm, applying about 500 g of pressing force between electrodes prescribed by KSC 2105, and applying a voltage of 1,000V in a wave form similar to a sine wave of a commercial frequency at room humidity for one minute and observing whether the specimen withstands the voltage for one minute. As a result, the adhesive tape satisfied the requirement at 1,000V for one minute.

Tensile strength (unit: kgf/19 mm) was measured using a universal testing machine (UTM). Measurement was carried out by preparing a specimen having a length of 150 mm along a length direction of the tape, fixing the specimen at an interval of 100 mm using a tensile strength tester, applying tension thereto at a rate of 300±30 mm/min, measuring elongation when the specimen is cut and calculating an average of the elongation values. As a result, the average thus obtained was 17.8 to 18.5 kgf/19 mm (reference: 10 kgf/19 mm or more).

Elongation (unit: %) was measured using a universal testing machine (UTM). Measurement was carried out by preparing a specimen having a length of 150 mm along a length direction of the tape, fixing the specimen at an interval of 100 mm using a tensile strength tester, applying tension thereto at a rate of 300±30 mm/min and measuring force several times when the specimen is cut and calculating an average of the force values. As a result, the average thus obtained was 29% to 39% (reference: 40% or less).

Adhesive force (Backing, unit: gf/19 mm) was measured using a common adhesive force tester. Specifically, 40 mm of the same tape as mentioned above was adhered to a SUS plate to manufacture a sample plate, a tape was adhered to the sample plate, the side of sample plate used for measuring adhesive force was pressed using a pressing machine, the side of sample plate not used for measuring adhesive force was inverted at 180 degrees and about 25 mm thereof was peeled off, the sample piece and the sample plate were coupled to a upper chuck and a lower chuck, respectively, in a tensile strength tester containing load cells of 25 kgf or less, and the sample piece and the sample plate were continuously pulled off each other at a rate of about 300±30 mm/min and then separated from each other. Whenever about 20 mm of the sample piece was separated, force was measured 4 times. The average of the four measurements was calculated. As a result, a minimum adhesive force was 250 gf/19 mm and a mean adhesive force was 320 gf/19 mm (reference: minimum: 130 gf/19 mm, average: 180 gf/19 mm).

Combustibility (unit mm/min) was measured using a common combustion tester. Combustibility testing was carried out by preparing a piece having a length of 350 mm and a predetermined width, folding the piece in half to manufacture a specimen having a width of 100 mm and a length of 350 mm and testing in accordance with MS 300-08 (flame retardancy testing at high temperatures is preformed or not performed). Testing was carried out on the tape adhesive surface and the tape back surface. As a result, the adhesive tape satisfies the requirement in which combustion does not occur at 80 mm/min or less or 50 mm or longer from the measuring point and extinguishing occurs within 60 seconds.

As apparent from the above description, the present invention provides a hand-tearable adhesive tape wherein a resin is directly coated with a mixture of a binder and a flame retardant and then coated with a flame retardant-containing adhesive agent to fix warps and wefts and prevent the adhesive agent from escaping into the base. The tape is made of a fabric woven with warps having a smaller titer than wefts and the wefts, to tear the tape to a desired length without using any tool and thereby improve production efficiency. Also, the adhesive tape exhibits self-extinguishability in which combustion does not occur at 80 mm/min or less or at 50 mm or more from a measuring point and extinguishing occurs within 60 seconds, and an adhesive force of 180 gf/19 mm or more.

Also, the adhesive tape satisfies a withstand voltage of 1 kV or more for one minute and abrasion resistance of 10,000 times or more.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a hand-tearable adhesive tape comprising:
    stretching yarns as raw materials, and twisting and untwisting the yarns by heating to perform false twisting;
    coating the yarns with a paste to subject the yarns to sizing for weaving smoothly;
    interlacing wefts with warps to weave a fabric;
    drying and ironing the woven fabric to subject the fabric to processing;
    applying a flame retardant to one side of the processed fabric, as a pretreatment process before adhesive application;
    applying an adhesive agent to a predetermined thickness to the processed fabric; and
    drying the fabric,
    wherein the process of applying an adhesive agent to the fabric is carried out by homogeneously mixing an acrylic emulsion and an adhesive resin for 30 to 90 minutes to prepare an adhesive agent, mixing the adhesive agent with the flame retardant and coating the fabric with the mixture.

2. The method according to claim 1, wherein in the weaving process, a density of the warps is between 32 and 37 yarns/cm and a titer of the warps per unit width is between 2,432 and 2,812 dtex/cm.

3. The method according to claim 1, wherein, in the weaving process, a density of the wefts is between 30 and 32 yarns/cm and a titer of the wefts per unit length is between 5,010 and 5,344 dtex/cm.

4. The method according to claim 1, wherein, in the weaving process, a density of the wefts is between 40 and 42 yarns/cm and a titer of the wefts per unit length is between 6,680 and 7,014 dtex/cm.

5. The method according to claim 1, wherein the process of applying the flame retardant is carried out by primarily directly coating the fabric with a binder-containing flame retardant at a temperature of 50° C. or higher, to prevent unraveling of yarns when the tape is torn.

6. The method according to claim 1, wherein in the process of applying an adhesive agent to the fabric, the adhesive resin is added in an amount of 50% to 200% by weight of, based on the weight of the acrylic emulsion.

7. The method according claim 1, wherein, in the process of applying an adhesive agent to the fabric, the flame retardant is added in an amount of 5% to 50% by weight, with respect to the total weight of the acrylic emulsion and the adhesive resin.

* * * * *